(12) United States Patent
Hanlon et al.

(10) Patent No.: US 8,319,384 B2
(45) Date of Patent: Nov. 27, 2012

(54) ELECTROMECHANICAL BRAKE ACTUATOR MOTOR BRAKE

(75) Inventors: Casey Hanlon, Queen Creek, AZ (US); James Neil Quitmeyer, Chandler, AZ (US); David M. Eschborn, Gilbert, AZ (US); Carol Lynn Eschborn, legal representative, Gilbert, AZ (US)

(73) Assignee: Honeywell International Inc., Morristown, NJ (US)

( * ) Notice: Subject to any disclaimer, the term of this patent is extended or adjusted under 35 U.S.C. 154(b) by 145 days.

(21) Appl. No.: 12/968,521

(22) Filed: Dec. 15, 2010

(65) Prior Publication Data

US 2012/0153753 A1 Jun. 21, 2012

(51) Int. Cl.
*H02K 7/10* (2006.01)
(52) U.S. Cl. ........................................... 310/77; 310/76
(58) Field of Classification Search ............... 310/76–80; 188/71.5
See application file for complete search history.

(56) References Cited

U.S. PATENT DOCUMENTS

| 5,205,382 | A | * | 4/1993 | Edmisten | 188/71.5 |
|---|---|---|---|---|---|
| 5,944,147 | A | * | 8/1999 | Berwanger | 188/71.5 |
| 6,003,641 | A | * | 12/1999 | Boehringer et al. | 188/71.5 |
| 6,241,052 | B1 | * | 6/2001 | Berwanger | 188/71.5 |
| 6,296,084 | B1 | * | 10/2001 | Trustee | 188/71.5 |
| 6,459,182 | B1 | * | 10/2002 | Pfann et al. | 310/77 |
| 6,702,068 | B1 | * | 3/2004 | Riebe | 188/71.5 |
| 6,752,248 | B2 | * | 6/2004 | Berwanger | 188/73.39 |
| 7,124,860 | B2 | * | 10/2006 | Souetre et al. | 188/71.5 |
| 2004/0011602 | A1 | * | 1/2004 | Souetre et al. | 188/71.5 |
| 2006/0152074 | A1 | | 7/2006 | Chico et al. | |
| 2008/0084109 | A1 | | 4/2008 | Griffith et al. | |

FOREIGN PATENT DOCUMENTS

WO 2008/105813 A2 9/2008

* cited by examiner

*Primary Examiner* — Thanh Lam
(74) *Attorney, Agent, or Firm* — Shumaker & Sieffert, P.A.

(57) ABSTRACT

In some examples, a system includes a brake rotor, a brake armature configured to engage with the brake rotor to substantially fix a rotational position of the brake rotor relative to the brake armature, and a mechanism mechanically coupled to the brake armature. The brake armature may be configured to rotate in a first rotational direction and a second rotational direction substantially opposite the first rotational direction. The mechanism may be configured to maintain the brake armature in a fixed rotational position when a torque applied to the brake armature in a second rotational direction is less than or equal to a threshold torque value. The mechanism also may be configured to permit rotation of the brake armature in the second rotational direction when torque on the brake armature in the second rotational direction exceeds the threshold torque value.

20 Claims, 6 Drawing Sheets

ELECTROMECHANICAL BRAKE ACTUATOR MOTOR BRAKE

TECHNICAL FIELD

The disclosure relates to motor brakes for electromechanical brake actuators.

BACKGROUND

Some aircraft brake assemblies include one or more brake rotors that rotate with an aircraft wheel and one or more brake stators that extend between the rotors and are fixed with respect to aircraft landing gear. The rotors and stators are arranged in an alternating manner to form a brake disk stack and are normally spaced so that the aircraft wheel can rotate freely. To apply braking force, the disk stack is compressed by an actuator and surfaces of the rotors and stators are forced into contact to slow and/or stop rotation of the aircraft wheel.

Various types of actuators may be used to apply pressure against the disk stack to compress the disk stack, including hydraulic actuators and electric actuators. In electric brake actuators, an electric motor receives electrical power from an aircraft power system and is controlled by electrical signals from an aircraft control system. The electric motor may be coupled to a motor shaft, which rotates under power of the electric motor. The motor shaft is coupled to a ram or piston that converts rotational motion of the motor shaft to linear motion of the ram or piston. The motor moves the ram or piston toward and away from the disk stack to apply and release pressure on the disk stack, respectively. The assembly of motor, shaft, and ram or piston may be referred to as an electromechanical actuator (EMA).

SUMMARY

In general, the disclosure describes a motor brake for an EMA motor. In accordance with aspects of the disclosure, the motor brake may include a mechanical assembly that automatically (e.g., without intervention by an electronic control system or a user) adjusts a braking force applied by the EMA to a brake stack based on torque applied to a motor shaft of the EMA.

In one aspect, the disclosure describes a system that includes a brake rotor, a brake armature, and a mechanism mechanically coupled to the brake armature. According to this aspect of the disclosure, the brake armature and the brake rotor are configured to engage each other to substantially fix a rotational position of the brake rotor relative to the brake armature. Additionally, the brake armature may be configured to rotate in a first rotational direction and a second rotational direction substantially opposite the first rotational direction. Also according to this aspect of the disclosure, the mechanism mechanically coupled to the brake armature is configured to maintain the brake armature in a fixed rotational position when a torque applied to the brake armature in a second rotational direction is less than or equal to a threshold torque value. The mechanism also may be configured to permit rotation of the brake armature in the second rotational direction when torque on the brake armature in the second rotational direction exceeds the threshold torque value.

In one aspect, the disclosure describes an EMA that includes a motor, a motor shaft coupled to the motor, and a brake rotor attached to the motor shaft in a substantially fixed rotational position relative to the motor shaft. According to this aspect of the disclosure, the EMA also includes a brake armature. The brake armature and the brake rotor are configured to engage each other to substantially fix a rotational position of the brake rotor relative to the brake armature, and the brake armature defines an outer circumference. The EMA may further include an armature support bearing engaged with the outer circumference of the brake armature and a mechanism coupled to the brake armature. The mechanism may substantially prevent the brake armature, when engaged with the brake rotor, from rotating beyond a fixed position in a first rotational direction. The mechanism also may restrict rotation (e.g., substantially prevent rotation or limit rotation relative to when the mechanism is not used) of the brake armature, when engaged with the brake rotor, in a second rotational direction when torque on the motor shaft in the second rotational direction is less than or equal to a threshold torque value. Additionally, the mechanism may allow the brake armature, when engaged with the brake rotor, to rotate in the second rotational direction when torque on the motor shaft in the second rotational direction exceeds the threshold torque value. The second rotational direction is substantially opposite to the first rotational direction.

In another aspect, the disclosure describes a method that includes attaching a brake rotor to a motor shaft of an EMA, where the brake rotor is in a substantially fixed rotational position relative to the motor shaft. The method further may include disposing a brake armature about the brake rotor such that the brake armature and the brake rotor can engage and disengage with each other. When the brake armature and the brake rotor are engaged, the brake armature may be held in a substantially fixed rotational position relative to the brake rotor. The method also may include mechanically coupling a mechanism to the brake armature. The mechanism may substantially prevent the brake armature, when engaged with the brake rotor, from rotating beyond a fixed position in a first rotational direction. The mechanism also may restrict rotation of the brake armature, when engaged with the brake rotor, in a second rotational direction when torque on the motor shaft in the second rotational direction is less than or equal to a threshold torque value. Additionally, the mechanism may allow the brake armature, when engaged with the brake rotor, to rotate in the second rotational direction when torque on the motor shaft in the second rotational direction exceeds the threshold torque value. The second rotational direction is substantially opposite to the first rotational direction.

The details of one or more examples are set forth in the accompanying drawings and the description below. Other features, objects, and advantages of the disclosure will be apparent from the description and drawings, and from the claims.

DETAILED DESCRIPTION

An EMA may include a motor brake that is engaged to fix a rotational position of the motor shaft and, thus, restrict extension and/or retraction of the ram. The motor brake may include a brake rotor attached to the motor shaft and a brake armature. The brake armature and brake rotor may be configured to engage and disengage with each other. Some brake armatures are fixedly attached to a housing of the EMA to prevent rotation of the brake armature and, thus, the brake rotor and motor shaft when the brake armature engages the brake rotor. However, when torque on the motor shaft is above a certain level, the torque may overcome the static friction force between the brake rotor and brake armature and cause the brake rotor to slip. When the brake rotor slips, the ram of the EMA may retract and reduce a force applied to the brake stack. The slippage of the brake rotor at a threshold torque level may help prevent or reduce damage to the EMA.

In general, the disclosure describes an EMA and a motor brake coupled to the EMA. In some examples, the EMA and motor brake may be utilized in a commercial, private, or military aircraft. In accordance with aspects of the disclosure, a motor brake for an EMA system may include a mechanical assembly that automatically (e.g., without intervention by an electronic control system or a user) adjusts a braking force applied to a brake stack (e.g., of an aircraft wheel brake or the like) based on torque applied to a motor shaft of the EMA. The motor brake may include a brake rotor mechanically attached to the motor shaft of the EMA such that the brake rotor is rotationally fixed relative to the motor shaft (e.g., the brake rotor rotates substantially synchronously with the motor shaft). The motor brake also may include a brake armature that is configured to engage with the brake rotor to restrict rotation of the brake rotor, and, thus, the motor shaft. The brake armature also is configured to disengage from the brake rotor to allow the brake rotor and motor shaft to rotate freely, e.g., under control of the motor of the EMA.

In accordance with aspects of the disclosure, the motor brake may automatically (i.e., without intervention by an electronic control system or a user and without electrical power) adjust a force applied to a brake stack in response to torque applied to the motor shaft of the EMA. For example, a circumference of the brake armature may be supported on an armature support bearing, which allows the brake armature to rotate. Rotation of the brake armature on the armature support bearing may be restricted by a mechanism, which may allow the brake armature to rotate only under predetermined conditions. For example, the mechanism may restrict rotation of the brake armature in a first direction, which may be a direction in which the motor rotates the motor shaft to extend the ram of the EMA and compress the brake stack, e.g., to maintain a force applied to the brake stack that enables the brake stack to function as a parking brake.

In some examples, the mechanism restricts rotation of the brake armature in the first direction such that the brake armature may not rotate beyond a fixed position. In some examples, the fixed position corresponds to a position of the brake armature when the motor brake is first engaged. In this way, the mechanism may restrain the motor shaft from rotating in the first direction beyond the position of the motor shaft when the motor brake was first engaged. In other examples, the fixed position corresponds to a predetermined rotational position of the motor shaft, and thus applied force on the brake stack, when the brake stack and EMA are at ambient temperature. In either example, the fixed position may limit extension of the ram and limit pressure exerted by the ram on the brake stack.

The mechanism also may control rotation of the brake armature in a second direction, which is opposite the first direction, and which may be a direction in which the motor shaft rotates to retract the ram of the EMA and decrease the compressive force applied to the brake stack. For example, the mechanism may include a device that stores and restores mechanical energy, such as a spring. The device may be selected to restrict rotation of the brake armature in the second direction (e.g., maintain a rotational position of the brake armature at the fixed position) when a torque exerted on the brake armature in the second direction is at or below a threshold torque level. In some examples, the threshold torque level may be determined by a preload on the device.

When the torque exerted on the brake armature in the second direction is above the threshold torque level, the device allows the brake armature to rotate in the second direction and stores mechanical energy that caused the brake armature to rotate. Because the motor shaft is fixed in relative rotation with the brake armature when the brake armature is engaged with the brake rotor, the motor shaft also rotates in the second direction and retracts the ram. In some examples, the retraction of the ram is limited such that the braking force on the brake stack is maintained at a level that maintains the aircraft or other vehicle in a parked position, and, in some cases, is maintained at the level at which the motor brake was initially engaged, prior to retraction of the ram. In some cases, permitting movement of the ram in the second direction may help prevent the force applied by the EMA to the brake stack from increasing relative to the initial force applied, e.g., when the motor brake was first engaged, or from increasing by an undesirable amount of force.

In some examples, the extent of rotation in the second direction may be limited, e.g., by an extent to which the ram may be retracted. For example, the ram may not be able to be retracted into a housing of the EMA. In this way, the motor brake can also be configured such that movement of the ram in the second direction, to the extent permitted by the motor brake, may help prevent the force applied by the EMA to the brake stack from decreasing relative to the initial force applied, e.g., when the motor brake was first engaged. When the torque exerted on the brake armature in the second direction decreases, e.g., due to decreased torque on the motor shaft, the device restores the stored mechanical energy, which causes the brake armature to rotate in the first direction, rotating the motor shaft and extending the ram. When the torque on the brake armature in the second direction decreases to the threshold torque level or below, the device may cause the brake armature to return to the fixed position.

Figure 1:
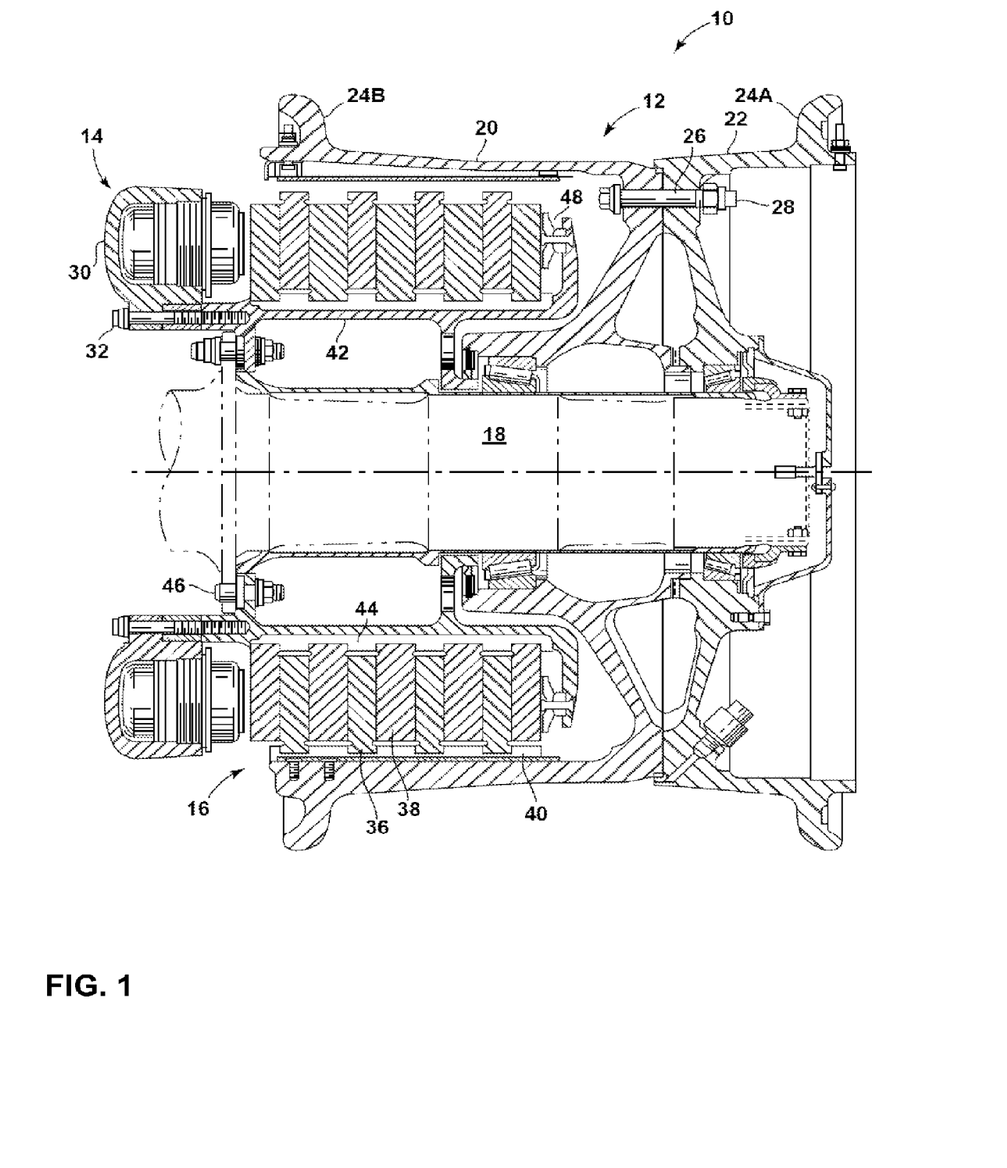
FIG. 1 is a schematic block diagram that illustrates an example aircraft wheel assembly.

FIG. 1 is a schematic diagram illustrating an example assembly for an aircraft that may include an electronic brake actuator in accordance with this disclosure. In particular, FIG. 1 illustrates an aircraft wheel assembly 10, which includes wheel 12, EMA 14, brake stack 16, and axle 18. While FIG. 1 illustrates a single wheel assembly 10, an aircraft may include multiple wheel assemblies 10. At least one when assembly 10 of an aircraft may include an electronic brake actuator in accordance with this disclosure. In some examples, all the wheel assemblies 10 of an aircraft may include an electronic brake actuator in accordance with this disclosure, while in other examples, fewer than all of the wheel assemblies 10 of an aircraft may include an electronic brake actuator in accordance with this disclosure. Additionally, although FIG. 1 illustrates a single EMA 14, in some examples, wheel assembly 10 may include a plurality of EMAs 14, e.g., at least two EMAs 14.

Wheel 12 includes wheel hub 20, wheel outrigger flange 22, bead seats 24A and 24B, lug bolt 26, and lug nut 28. EMA 14 includes actuator housing 30, actuator housing bolt 32, and ram 34. Brake stack 16 includes alternating rotor discs 36 and stators 38, which move relative to each other. Rotor discs 36 are mounted to wheel 12, and in particular wheel hub 20, by beam keys 40. Stator discs are mounted to axle 18, and in particular torque tube 42, by splines 44. Wheel assembly 10 may support any variety of private, commercial, or military aircraft.

Wheel assembly 10 includes wheel 12, which in the example of FIG. 1 is defined by a wheel hub 20 and a wheel outrigger flange 22. Wheel outrigger flange 22 is mechanically affixed to wheel hub 20 by lug bolts 26 and lug nuts 28. Wheel 12 defines bead seals 24A and 24B. During assembly, an inflatable tire (not shown) may be placed over wheel hub 20 and secured by wheel hub 20 and wheel outrigger flange 22. Thereafter, lug nuts 28 can be tightened on lug bolts 26, and the inflatable tire can be inflated. Bead seals 24A and 24B provide a hermetic seal for the inflatable tire.

Wheel assembly 10 may be mounted to an aircraft via torque tube 42 and axle 18. In the example of FIG. 1, torque tube 42 is affixed to axle 18 by a plurality of bolts 46. Torque tube 42 supports at least one EMA 14 and stators 38. Axle 18 may be mounted on a strut of a landing gear (not shown) to connect wheel assembly 10 to an aircraft.

During operation of the aircraft, braking may be necessary from time to time, such as during landing and taxiing. Wheel assembly 10 may support braking through the at least one EMA 14 and brake stack 16. EMA 14 includes actuator housing 30 and ram 34 and is mounted to torque tube 42 by actuator housing bolt 32. During operation, ram 34 may be extended away from actuator housing 30 to axially compress brake stack 16 against compression point 48 for braking. Conversely, ram 34 may be retracted towards actuator housing 30 to release compression of brake stack 16 against compression point 48.

Brake stack 16 includes alternating rotor discs 36 and stator discs 38. Rotor discs 36 are mounted to wheel hub 20 for common rotation by beam keys 40. Stator discs 38 are mounted to torque tube 42 for common rotation by splines 44. In the example of FIG. 1, brake stack 16 includes four rotors and five stators. However, a different number of rotors and/or stators may be included in brake stack 16. Further, the relative positions of the rotors and stators may be reverse, e.g., such that rotor discs 36 are mounted to torque tube 42 and stator discs 38 are mounted to wheel hub 20.

Rotor discs 36 and stator discs 38 provide opposing friction surfaces for braking an aircraft. As kinetic energy of a moving aircraft is transferred into thermal energy in brake stack 16, temperatures may rapidly increase in brake stack 16, e.g., beyond 200 degrees Celsius in some cases. With some aircraft, emergency braking may result in temperatures in excess of 500 degrees Celsius, and in some cases, even beyond 800 degrees Celsius. As such, rotor discs 36 and stator discs 38 that form brake stack 16 may be formed from robust, thermally stable materials capable of operating at such temperatures. In one example, rotor discs 36 and stator discs 38 are formed of a metal alloy such as, e.g., a super alloy based on nickel (Ni), cobalt (Co), iron (Fe), or the like. In another example, rotor discs 36 and/or stator discs 38 are formed of a carbon-carbon (C—C) composite material.

Independent of the specific material chosen, rotor discs 36 and stator discs 38 may be formed of the same materials or different materials. For example, wheel assembly 10 may includes metal rotor discs 36 and C-C composite stator discs 38, or vice versa. Further, each disc of the rotor discs 36 and/or each disc of the stator discs 38 may be formed of the same materials or at least one disc of rotor discs 36 and/or stator discs 38 may be formed of a different material than at least one other disc of the rotor discs 36 and/or stator discs 38.

As discussed above, rotor discs 36 and stator discs 38 may be mounted in wheel assembly 10 by beam keys 40 and splines 44, respectively. Beam keys 42 may be circumferentially spaced about an inner portion of wheel hub 20. Beam keys 42 may be shaped with opposing ends (e.g., opposite sides of a rectangular) and may have one end mechanically affixed to an inner portion of wheel hub 20 and an opposite end mechanically affixed to an outer portion of wheel hub 20. Beam keys 42 may be integrally formed with wheel hub 20 or may be separate from and mechanically affixed to wheel hub 20, e.g., to provide a thermal barrier between rotor discs 36 and wheel hub 20. In different examples, wheel assembly 10 may include a heat shield (not shown) that extends out radially and outwardly surrounds brake stack 16, e.g., to limit thermal transfer between brake stack 16 and wheel 12.

Splines 44 may be circumferentially spaced about an outer portion of torque tube 42. Splines 44 may be integrally formed with torque tube 42 or may be separate from and mechanically affixed to torque tube 42. In some examples, splines 44 may define lateral grooves in torque tube 42. As such, stator discs 38 may include a plurality of radially inwardly disposed notches configured to be inserted into a respective spline.

Because beam keys 40 and splines 44 may be in thermal contact with rotor discs 36 and stator discs 38, respectively, beam keys 40 and/or splines 44 may be made of thermally stable materials including, e.g., those materials discussed above with respect to rotor discs 36 and stator discs 38. In some examples, a pitch densification apparatus that is configured to densify a material using one or more of a plurality of different pitch densification cycles, may be used to form a C-C composite component that defines a general shape of a rotor discs 36, stator discs 38, beam key 40, and/or spline 44.

In spite of use of these features (e.g., a heat shield, beam keys 40, splines 44, materials from which rotor discs 36, and stator discs 38 are formed) to limit heat transfer from rotor discs 36 and stator discs 38 to other components of wheel assembly 10, such as beam keys 40, splines 44, torque tube 42, or the like, heat transfer may still occur. For example, when an aircraft lands, taxis to an arrival gate (or other location), and is parked, the pilot of the aircraft may engage a parking brake of the aircraft to maintain the aircraft in the parked condition (also referred to as a parked state), including while the aircraft is powered down. During the landing of the aircraft and the taxiing of the aircraft to the arrival gate, rotor discs 36 and stator discs 38 may absorb large amounts of heat due to friction between rotor discs 36 and stator discs 38 during braking Over time, even after parking the aircraft and engaging a parking brake of the aircraft, the heat in rotor discs 36 and stator discs 38 may be released from rotor discs 36 and stator discs 38 and may transfer to adjacent components of wheel assembly 10, such as torque tube 42. In some examples, this may cause expansion and contraction of the components of wheel assembly 10, such as torque tube 42, and may result in changing amounts of force being applied to EMA 14 (including a motor of EMA 14), rotor discs 36, stator discs 38, or other components of wheel assembly 10.

In some cases, the force applied to rotor discs 36 and stator discs 38 may be reduced due to the expansion and/or contraction of the components of wheel assembly 10, and the brake system may become ineffectual (e.g., rotor discs 36 and stator discs 38 may no longer contact each other), potentially allowing the aircraft to move from the parked condition. In other cases, the force applied to, for example, rotor discs 36, stator discs 38, and/or EMA 14 may be increased due to expansion and/or contraction of the components of wheel assembly 10 to an undesirable magnitude.

In some examples, in an attempt to address the issues caused by thermal expansion and contraction of components of wheel assembly 10, a control system may periodically provide power to EMA 14 to adjust a force applied by EMA 14 to brake stack 16. However, periodically activating the electrical systems of the aircraft to adjust the brake force applied by EMA 14 to brake stack 16 may be disadvantageous in some examples, as this requires periodic use of electrical power, and may result in depletion of a battery or other power source of the airplane. Additionally or alternatively, an electrical system of an aircraft that is configured to periodically activate and adjust the brake force applied by EMA 14 to brake stack 16 may introduce undue complexity to the electrical system and the electronic control system of the airplane.

In accordance with aspects of the disclosure, wheel assembly 10 may include a parking brake that automatically (i.e., without intervention by an electronic control system or a user and without provision of electrical power) adjusts a braking force applied to brake stack 16 based on torque applied to a motor shaft of EMA 14. The parking brake generally may include brake stack 16 and EMA 14. When an operator engages the parking brake, EMA 14 may be engaged to extend ram 34 and compress brake stack 16. EMA 14 may include a motor brake that may be engaged upon engaging the parking brake to restrict rotation of a motor shaft of EMA 14 and thus movement of ram 34.

Figure 2:
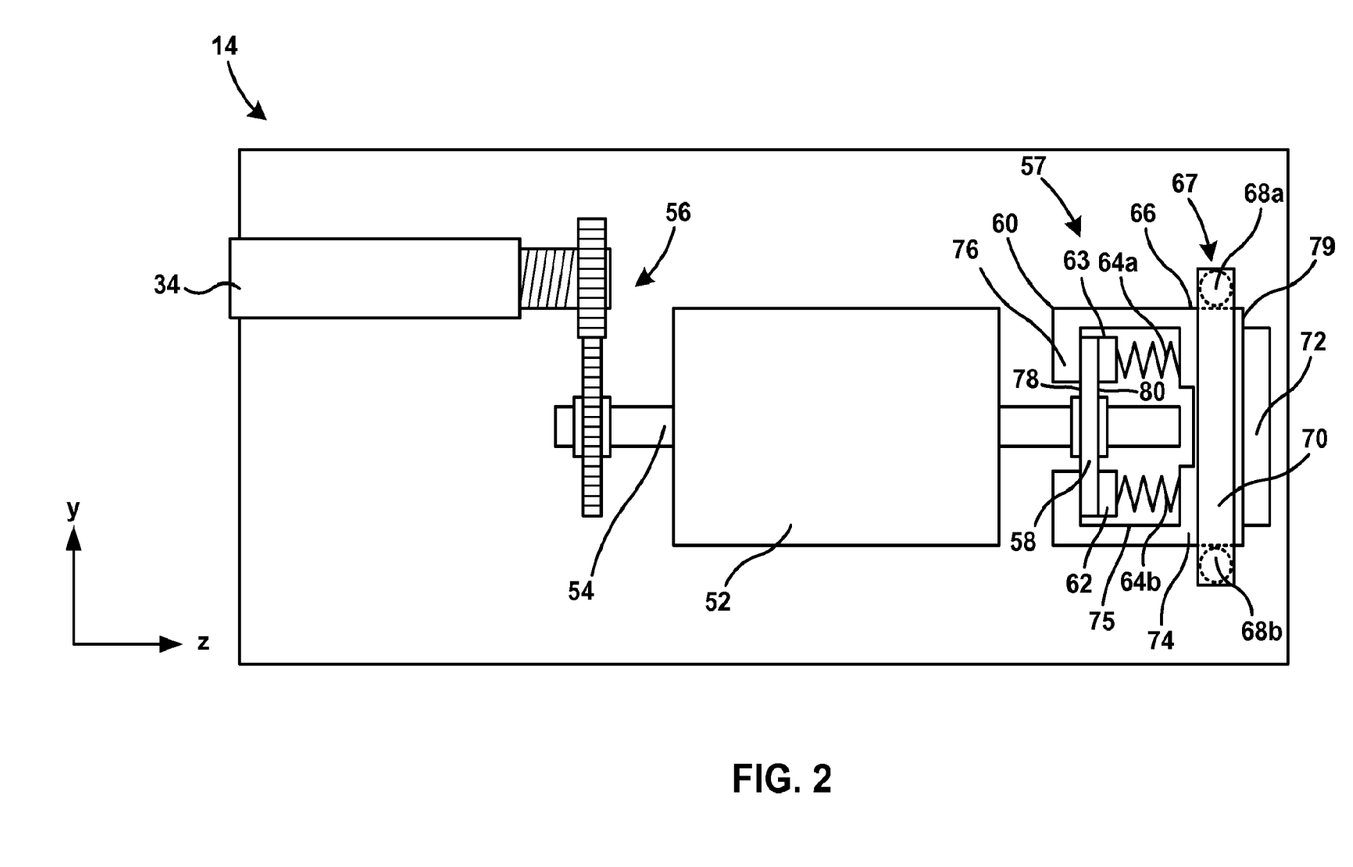
FIG. 2 is a schematic block diagram that illustrates an example EMA that includes a motor brake according to an example of the disclosure.
Figure 3:
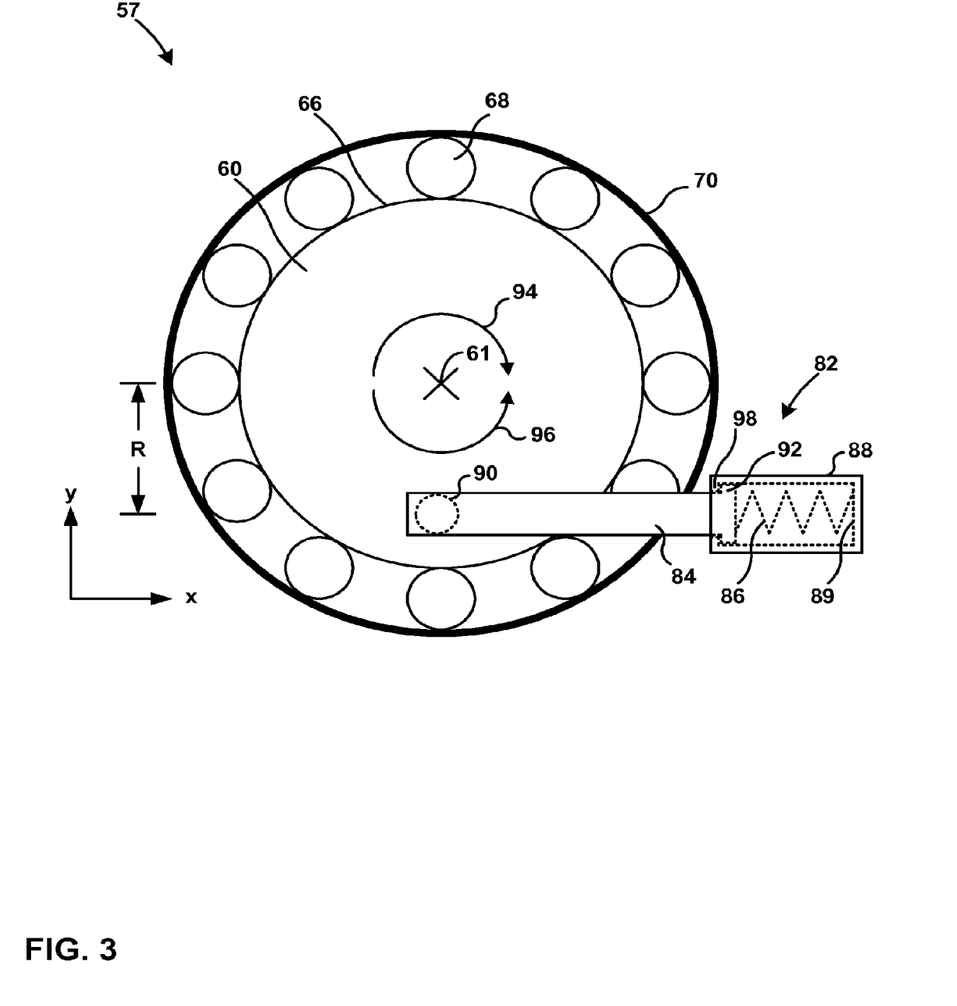
FIGS. 3-5 are schematic block diagrams that illustrate examples of a motor brake of an electromagnetic actuator according to examples of the disclosure.

FIG. 2 is a schematic cross-sectional illustration of one example of EMA 14, which includes motor brake 57. EMA 14 also includes a motor 52, a motor shaft 54, a series of gears 56, and ram 34. FIG. 3 is a schematic block diagram that illustrates a portion of motor brake 57 from a different perspective (a perspective oriented towards an end surface 79 of brake armature 60).

Motor 52 converts electrical power to rotational motion of motor shaft 54. In the example shown in FIG. 2, motor shaft 54 is configured to rotate in a first rotational to linearly extend ram 34 and a second rotational direction opposite the first rotational direction to linearly retract ram 34. Gears 56 may multiply torque produced by motor 52. Ram 34 may include, for example, a ball screw, roller screw, or other device that transforms rotary motion of motor shaft 54 and gears 56 to linear motion, i.e., extension and retraction of ram 34. As described in further detail below, rotation of motor shaft 54 and, thus, extension or retraction of ram 34, may be due to motor 52 or may be due to force exerted on ram 34, e.g., by brake stack 16.

In the example shown in FIG. 2, motor brake 57 includes a brake rotor 58 attached to a motor shaft 54 in a substantially fixed rotational position relative to motor shaft 54 (e.g., brake rotor 58 rotates substantially synchronously with motor shaft 54). In some examples, brake rotor 58 may be attached to motor shaft 54 in a manner that allows brake rotor 58 to move axially relative to motor shaft 54, e.g., brake rotor 58 may be attached to motor shaft 54 via splines and grooves or via a keyway and key. In other examples, brake rotor 58 may be attached to motor shaft 54 in a manner that does not allow brake rotor 58 to move axially relative to motor shaft 54. Brake rotor 58 may include a first axial surface 78 and a second axial surface 80 that is substantially parallel to and facing an opposite direction than first axial surface 78. Motor brake 57 also includes a brake rotor 58 that is configured to movably engage with brake armature 60, which restricts rotation of brake rotor 58, and, thus, motor shaft 54. Brake rotor 58 also is configured to movably disengage from the brake armature 60 to allow brake rotor 58 and motor shaft 54 to rotate freely (e.g., under control of motor 52).

In the illustrated example, brake armature 60 includes a body 74 that, on one end, includes an end member 76 that can be engaged with a first axial surface 78 of brake rotor 58. In some examples, body 74 may include a single end member 76, which may be an annular disc. In other examples, body 74 may include a plurality of end members 76, which may be other shapes, e.g., sections of an annular disc, square, rectangular, or the like. In some examples, body 74 of brake armature 60, including end member 76, may be maintained in a fixed axial position (in the x-axis direction of FIG. 2) with respect to motor shaft 54.

Brake armature 60 also includes an armature plate 62 that movably engages with a second axial surface 80 of brake rotor 58. Armature plate 62 may be an annular disc in some examples. In the example illustrated in FIG. 2, armature plate 62 is attached to body 74 of brake armature 60 by a first spring 64a a second spring 64b (collectively "springs 64"). Springs 64 are configured to exert force on armature plate 62 to move armature plate 62 towards end member 76 and compress brake rotor 58 between end member 76 and armature plate 62. Although FIG. 2 illustrates two springs 64, in other examples, parking brake 57 may include a single spring 64 or more than two springs 64.

In some examples, armature plate 62 is maintained in a substantially fixed rotational position relative to body 74 of brake armature 60. For example, armature plate 62 and body 74 may engage along at least a portion of an outer circumference 63 of armature plate 62 and at least a portion of an inner circumference 75 of body 74 via a keying mechanism, such as one or more slots with complementary guide pins, or ridges. In this way, when armature plate 62 and end member 76 are engaged with brake rotor 58, brake rotor 58 is substantially rotationally restrained relative to brake armature 60.

Motor brake 57 also includes a solenoid 72, which when energized, may magnetize body 74 to magnetically attract armature plate 62 toward body 74 (away from end member 76). In some examples, solenoid 72 may be attached to body 74 of brake armature 60 such that solenoid 72 rotates synchronously with brake armature 60. Although not shown in FIG. 2, solenoid 72 may receive electrical power from at least one conductor. In some examples, the electrical conductor may be electrically coupled to solenoid 72 via a flying lead, a slip ring, or another electrical connection that facilitates electrical conduction between the conductor and solenoid 72 while facilitating rotation of solenoid 72.

When solenoid 72 is energized, armature plate 62 disengages brake rotor 58, which may allow brake rotor 58 to move axially away from end member 76 and disengage from end member 76. This disengages motor brake 57 and motor shaft 54 may be allowed to rotate freely (e.g., under control of motor 52). When solenoid 72 is not energized, the force exerted by springs 64 on armature plate 62 compresses brake pad 58 between armature plate 62 and end member 76 and engages motor brake 57. Thus, motor brake 57 may be engaged when no electrical power is provided to EMA 14.

Brake armature 60 defines an outer circumference 66 that is in contact with an armature support bearing 67, which includes a plurality of bearings 68, including the illustrated bearings 68a and 68b (collectively "bearings 68") and bearing housing 70. Armature support bearing 67 may facilitate rotation of brake armature 60 under predetermined conditions (e.g., in first rotational direction 94 and/or second rotational direction 96 shown in FIG. 3). Although bearings 68 are illustrated in FIG. 2 as ball bearings, in other examples, bearings 68 may include, for example, a plane bearing, another type of rolling-element bearing, a fluid bearing, or the like.

Figure 4:
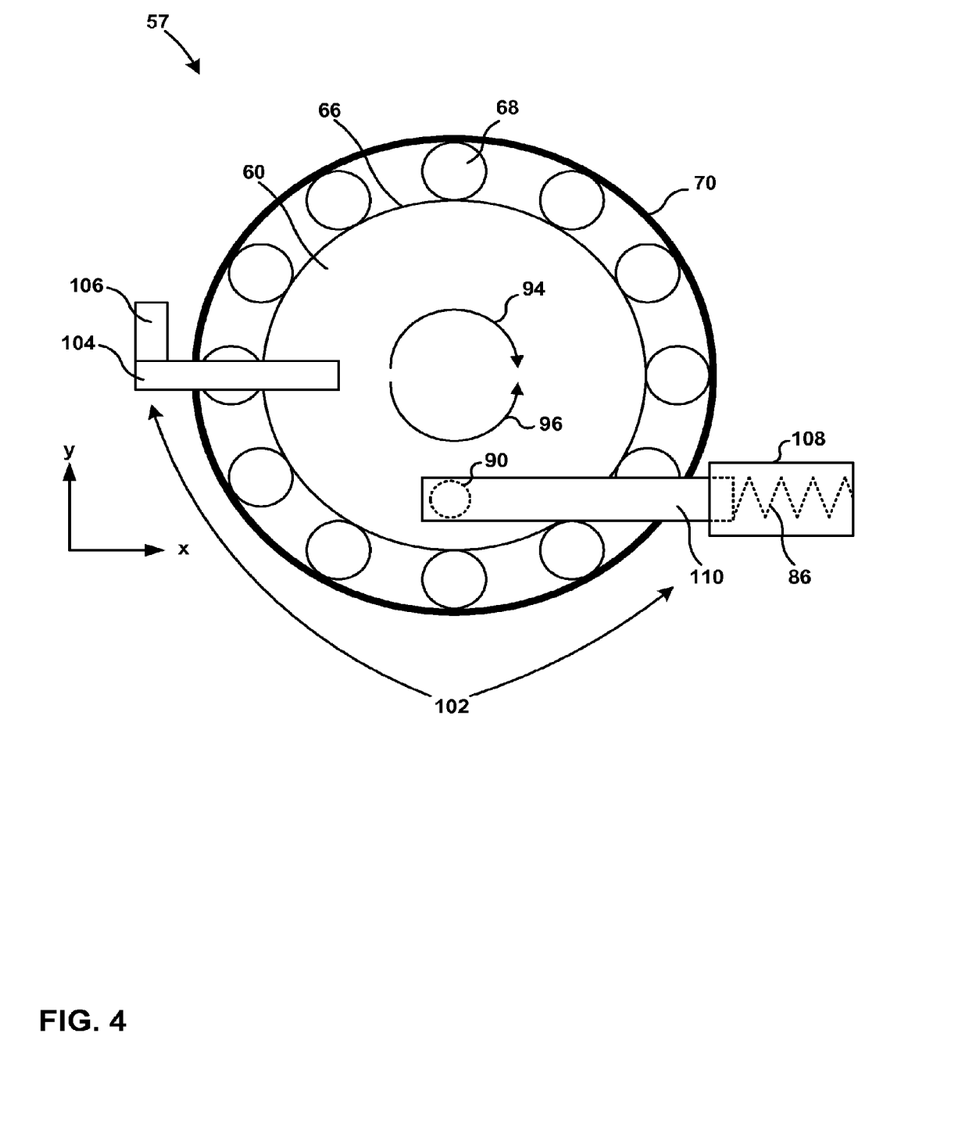
Figure 5:
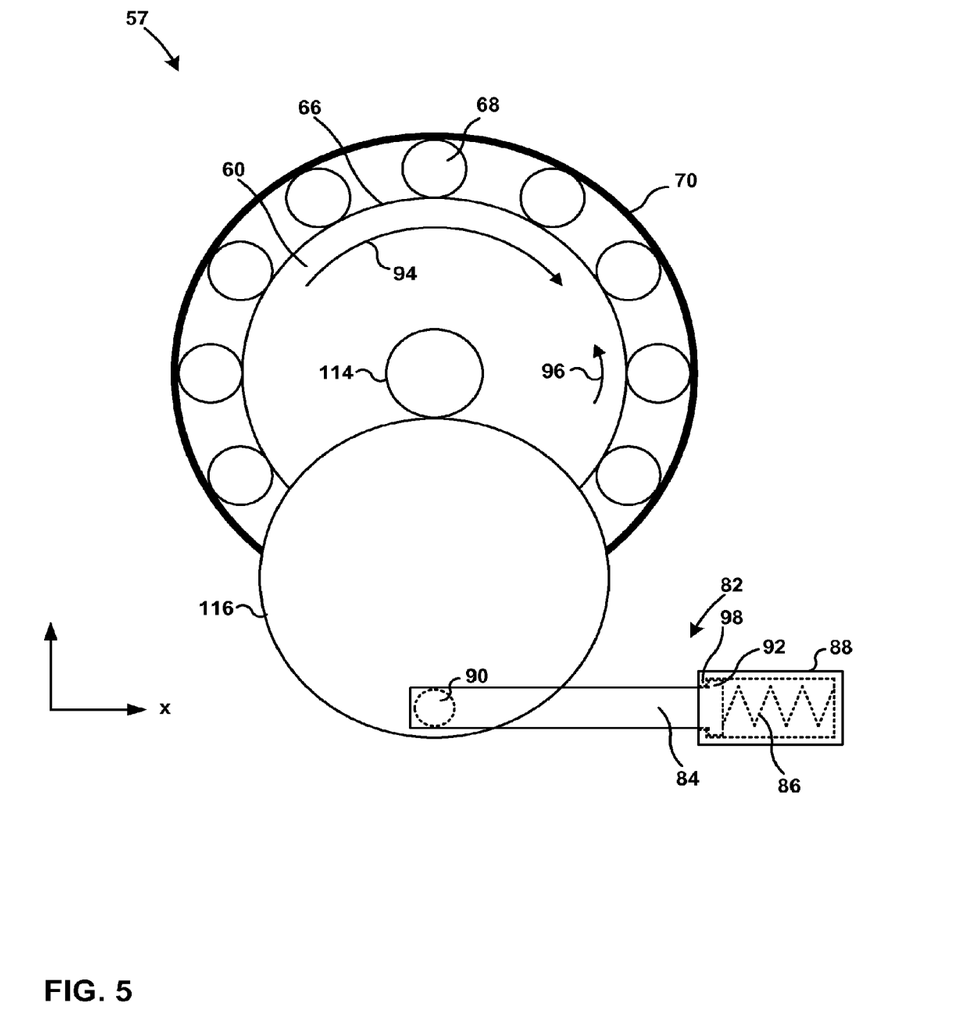

Additionally, motor brake 57 includes a mechanism that restricts rotation of brake armature 60, and may allow rotation of brake armature 60 under certain, predetermined conditions. FIGS. 3-5 illustrate various examples of different mechanisms 82, 102. In FIGS. 3-5, motor brake 57 is shown from the perspective viewed when facing end surface 79 of brake armature 60, which is shown in FIG. 2. For sake of clarity, FIGS. 3-5 omit solenoid 72, although each of the examples illustrated in FIGS. 3-5 may include solenoid 72. In the examples shown in FIGS. 3-5, brake armature 60 is configured to rotate about center axis 61. In some examples, center axis 61 may correspond to a center axis of rotation of motor shaft 54 (shown in FIG. 2).

In some examples, mechanism 82 restricts rotation of brake armature 60 about center axis 61 beyond a fixed point in first rotational direction 94. First rotational direction 94 may be the direction in which motor shaft 54 rotates to extend ram 34 and compress brake stack 16 (FIG. 1). In some examples, the fixed point may be set or configured to be a rotational position of brake armature 60 when brake armature 60 first engages brake rotor 58, i.e., the rotational position of brake armature 60 corresponding to the initial engagement of motor brake 57. In other examples, the fixed point may be set or configured to be a rotational position of brake armature 60 and motor shaft 54 that results in a predetermined compression force being applied by ram 34 to brake stack 16 when brake stack 16 is at ambient temperature (e.g., after brake stack 16 and other components of wheel assembly 10 have cooled to ambient temperature). When motor brake 57 is initially engaged, ram 34 is extended toward brake stack 16 by an initial extension amount in order to maintain brake 16 in a compressed state, such that the aircraft remains braked. Because brake armature 60, brake rotor 58, and motor shaft 54 are rotatably coupled such that they rotate together (e.g., in synchrony) when brake armature 60 is engaged with brake rotor 58 (FIG. 2), mechanism 82 may limit extension of ram 34 toward brake stack 16 to the initial extension amount by limiting rotation of the brake armature 60 in first rotational direction 94 to the fixed position.

Mechanism 82 may also restrict rotation of brake armature 60 in a second rotational direction 96 that is substantially opposite first rotational direction 94. Second rotational direction 96 corresponds to the direction in which motor shaft 54 rotates to cause ram 34 to retract from brake stack 16 and lower a pressure exerted on brake stack 16, e.g., thereby releasing the braking force. In the examples shown in FIGS. 3-5, mechanism 82 includes a device that stores and restores mechanical energy, such as a spring 86. The device may be selected to restrict rotation of brake armature 60 in second rotational direction 96 (e.g., maintain a rotational position of brake armature 60 at the fixed position) when a torque exerted on brake armature 60 in the second rotational direction 96 is below a threshold torque level. In some examples, the threshold torque level may be determined by a preload on the device. As discussed above, in some examples, the fixed position of brake armature 60 may correspond to a position of brake armature 60 when motor brake 57 is first engaged.

The torque exerted on brake armature 60 in second direction 96 may be generated by back force against ram 34 (e.g., a force in a direction away from brake stack 16 and also toward motor brake 57 in the example shown in FIG. 2). For example, as described above, rotor discs 36 and stator discs 38 (FIG. 1) may absorb large amounts of energy during braking, thereby generating thermal energy, and the thermal energy may gradually transfer to other components of wheel assembly 10 (FIG. 1), such as torque tube 42 (FIG. 1). In some examples, the release of heat from rotor discs 36 and stator discs 38 may continue after a pilot engages motor brake 57. The released heat may cause thermal expansion of components of wheel assembly 10, such as torque tube 42, which may change relative positioning of components of wheel assembly 10, e.g., positioning between ram 34 and brake stack 16. In some examples, this may lead to an increase in force exerted between ram 34 and brake stack 16. This increased force may be transmitted from ram 34 through gears 56 to motor shaft 54 as torque exerted in the second rotational direction 96. When motor brake 57 is engaged, e.g., when armature plate 62 and end member 76 compress brake rotor 58 and maintain substantially synchronous rotation positioning between brake rotor 58 and brake armature 60, the torque can be transmitted from motor shaft 54 to brake armature 60 via brake rotor 58.

When the torque exerted on brake armature 60 in second rotational direction 96 is above the threshold torque level, the device allows brake armature 60 to rotate in the second rotational direction 96 and stores mechanical energy that caused brake armature 60 to rotate. Because motor shaft 54 is substantially fixed in relative rotation with brake armature 60 when brake armature 60 is engaged with brake rotor 58, motor shaft 54 rotates in second rotational direction 96 and retracts ram 34. Due to the restoration force exerted by the device on brake armature 60, the force exerted by ram 34 on brake stack 16 may increase. However, the torque exerted by the brake rotor 58 on end member 76 and armature plate 62 (at first surface 78 and second surface 80) may be mitigated (e.g., reduced or increased to a lesser amount than if brake armature 60 was not allowed to rotate). The mitigation of torque between brake rotor 58 and end member 76 and armature plate 62 may reduce or substantially prevent torque exerted on motor shaft 54 due to a force on ram 34 from causing slippage between brake rotor 58 and brake armature 60.

In some examples, if torque exerted on motor shaft 54 due to a force on ram 34 increases sufficiently, the device may substantially prevent brake armature 60 from rotating any further in the second rotational direction 96. For example, the device may include a coil spring 86 (FIG. 3), and coil spring 86 may prevent brake armature 60 from rotating in the second rotational direction 96 when coil spring 86 is substantially fully compressed. Once the coil spring 86 is substantially fully compressed, any additional torque on motor shaft 54 may increase torque at the interface between brake rotor 58 and end member 76 and brake rotor 58 and armature plate 62. In some examples, the torque at the interface may exceed the static friction at first surface 78 of brake rotor 58 and second surface 80 of brake rotor 58 and brake rotor 58 may slip rotationally relative to brake armature 60. In some examples, this may reduce a likelihood of damage to motor brake 57, motor 52, or another component of wheel assembly 10.

When the torque exerted on brake armature 60 in second rotational direction 96 decreases, e.g., due to decreased torque on motor shaft 54, the device restores the stored mechanical energy, which causes brake armature 60 to rotate in first rotational direction 94, rotating motor shaft 54 and extending ram 34 toward brake stack 16 and also away from motor brake 57 in the example shown in FIG. 2. In some examples, the decreased torque on motor shaft 54 may be due to decreased back force on ram 34, e.g., due to cooling of components of wheel assembly 10 and, in some cases, a return to previous dimensions of the components. When the torque on brake armature 60 in the second direction decreases to the threshold torque level or below, the device may cause brake armature 60 to return to the fixed position, e.g., to the position of brake armature 60 when motor brake 57 was initially engaged. In turn, this may return the force exerted by ram 34 on brake stack 16 to the initial force when motor brake 57 was engaged.

FIGS. 3-5 illustrate different examples of mechanism 82, 102. In the example of FIG. 3, mechanism 82 includes a coil spring 86 disposed in a spring housing 88 and connected to a connecting member 84. Connecting member 84 is coupled to brake armature 60 by a rotational connector 90.

In the example of FIG. 3, connecting member 84 may include a stopping member 92, which physically contacts shoulder 98 of spring housing 88 to limit extension of connecting member 84 from spring housing 88. By limiting extension of connecting member 84, stopping member 92 and shoulder 98 may limit rotation of brake armature 60 in first rotational direction 94. In this way, stopping member 92 and shoulder 98 operate together to set the fixed position beyond which brake armature 60 cannot rotate in first rotational direction 94. In some examples, when motor brake 57 is initially engaged (to restrict rotation of motor shaft 54), stopping member 92 may be in physical contact with shoulder 98, which may set the fixed point beyond which rotation of brake armature 60 in first rotational direction is restricted.

In the example of FIG. 3, the device which stores and restores mechanical energy is spring 86. Spring 86 is preloaded to resist compression between end 89 of housing 88 and connecting member 84 due to movement of connecting member 84 in the positive x-axis direction (orthogonal x-y axes are shown in FIG. 3 for ease of description). As described above, the amount of preloading of spring 86 may be determined by, for example, the amount of torque (the threshold torque level) at which rotation of brake armature 60 in the second rotational direction 96 is to be allowed. In some examples, the threshold torque level is determined by considering at least one of the amount of heat generated by braking by wheel assembly 10, the amount of thermal expansion and/or contraction of components of wheel assembly 10 due to changes in temperature, an amount of predetermined maximum applied force between ram 34 and brake stack 16, or the like. Once the threshold torque level is determined, the preload of spring 86 may be determined based on the threshold torque and the working radius R (i.e., the distance between the rotational center 64 of brake armature 60 and rotational connector 90).

Torque is converted to linear force and transferred from brake armature 60 to spring 86 via rotational connector 90 and connecting member 84. When the torque is above the threshold torque level (which relates to a linear force above the preloading of spring 86), spring 86 compresses and stores the mechanical energy, allowing brake armature 60 to rotate in second rotational direction 96. When the torque on brake armature 60 further increases, spring 86 may further compress. However, when the torque on brake armature 60 is above the threshold torque level and decreases, the force exerted by spring 86 on connecting member 84 in the negative x-axis direction causes brake armature 60 to rotate in first rotational direction 94. As torque on brake armature 60 continues to decrease, the spring force of spring 86 continues to cause brake armature 60 to rotate in first rotational direction 94. Once stopping member 92 contacts shoulder 98 of spring housing 88 (e.g., the torque on brake armature 60 reduces below the threshold torque level), connecting member 84 is discouraged from extending from spring housing 88 any further, and brake armature 60 is prevented from rotating any further in first rotational direction 94.

In some examples, the physical size and/or spring constant of spring 86 may be selected so that spring 86 always exerts a force sufficient to maintain brake stack 16 in compressed state in which the wheel is in a braked position.

In some examples, as illustrated in FIG. 4, a mechanism 102 may include a different device for setting the fixed position of brake armature 60. In the example of FIG. 4, mechanism 102 includes spring 86 disposed in spring housing 108. Spring 86 is connected to connecting member 110, which is coupled to brake armature 60 by rotational connector 90. In contrast to spring housing 88 and connecting member 84 of FIG. 3, spring housing 108 illustrated in FIG. 4 does not include shoulder 98 and connecting member 110 does not include stopping member 92.

Mechanism 102 of FIG. 4 also includes a hard stop 106 and an anti-rotational pin 104. Anti-rotational pin 104 is fixedly attached to brake armature 60. Hard stop 106 and anti-rotational pin 104 cooperate to restrict rotation of brake armature 60 in first rotational direction 94. For example, when motor brake 57 is initially engaged, brake armature 60 may be in a rotational position such that hard stop 106 and anti-rotational pin 104 are in contact. This may set the maximum extent of rotation of brake armature 60, and thus brake rotor 58 and motor shaft 54, in first rotation direction 94. Spring 86 and connecting member 110 may function similar to spring 86 and connecting member 84 of FIG. 3 in controlling rotation of brake armature in second rotational direction 96.

In some examples, motor brake 57 is configured to permit brake armature 60 to rotate in the second rotational direction 96 an amount greater than feasible with a direct mechanical connection to spring 86, e.g., due to space constraints or a desire to allow brake armature 60 to rotate more than a half rotation in the second rotational direction 96. In such examples, the mechanism may be coupled to brake armature 60 by a series of gears. One example of such a connection is shown in FIG. 5.

In the example illustrated in FIG. 5, first gear 114 is attached to brake armature 60 and is rotationally fixed relative to brake armature 60. Second gear 116 is not attached to brake armature 60, and is coupled to connecting member 84 by rotational connector 90. Together, first gear 114, second gear 116, and rotational connector 90 transfer and translate rotational motion of brake armature 60 into linear motion of connecting member 84. Although mechanism 82 is shown in use with first gear 114 and second gear 116 in FIG. 5, in other examples, mechanism 102, including hard stop 106 and anti-rotational pin 104, may be utilized with a series of gears, such as first gear 114 and second gear 116.

Although all examples of mechanism 82, 102 in FIGS. 3-5 have been described with respect to a compression spring, other types of devices for storing and restoring mechanical energy may be utilized in a motor brake in accordance with this disclosure. For example, instead of a compression spring, the device may include a torsion spring, an extension spring, a leaf spring, a torsion bar, or a ball ramp mechanism.

Figure 6:
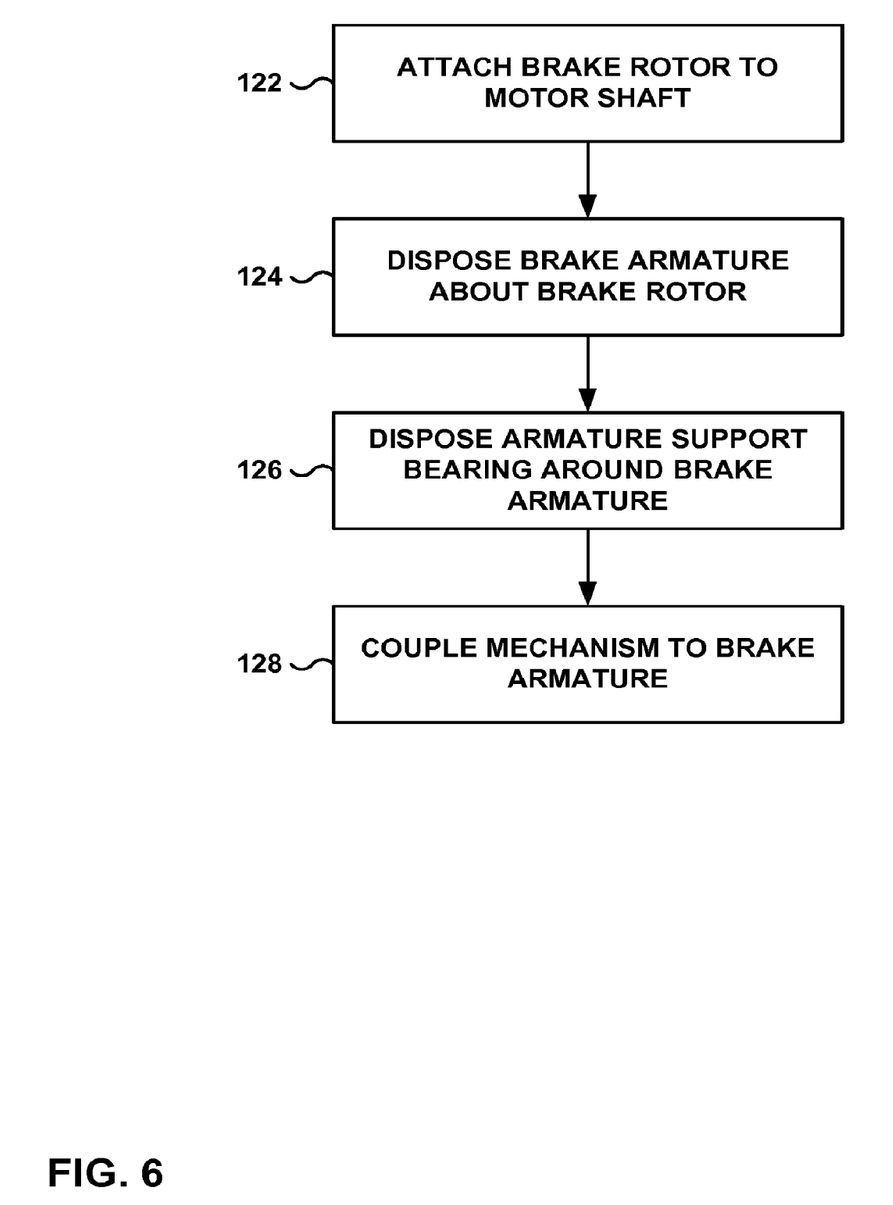
FIG. 6 is a flow diagram of an example method for forming an EMA that includes a motor brake according to an example of the disclosure.

FIG. 6 is a flow diagram that illustrates an example technique for forming an EMA that includes a motor brake according to the disclosure. The technique of FIG. 6 will be described with concurrent reference to FIGS. 2 and 3. The technique includes attaching brake rotor 58 to motor shaft 54 (122). As described above, brake rotor 58 may be attached to motor shaft 54 such that brake rotor 58 rotates synchronously with motor shaft 54. In some examples, brake rotor 58 may be attached to motor shaft 54 by, for example, splines and grooves or a keyway and key.

The technique further includes disposing brake armature 60 about brake rotor 58 (124). Brake armature 60 may be disposed about brake rotor 58 so that brake armature 60 can engage with brake rotor 58 to substantially fix brake rotor 58 in synchronous rotation with brake armature 60. For example, as illustrated in FIG. 2, brake armature 60 may include end member 76 that is disposed proximate to first axial surface 78 of brake rotor 58 and armature plate 62 that is disposed proximate to second axial surface 80 of brake rotor 58. As described above, armature plate 62 may move into and out of engagement with brake rotor 58 under influence of springs 64 and solenoid 72 to compress and release brake rotor 58.

The technique for assembling EMA 14, including motor brake 57, further includes disposing armature support bearing 67 around outer circumference 66 of brake armature 60 (126). As described above, armature support bearing 67 may include, in some examples, bearings 68 and bearing housing 70. In some examples, armature support bearing 67 may include a plane bearing, in which outer circumference 66 of brake armature 60 may contact a surface of bearing housing 70 with or without a lubricant between the surfaces, and with no moving bearing elements between circumference 66 and housing 70. In other examples, armature support bearing 67 may include a fluid bearing, another type of rolling-element bearing, or the like.

The technique for assembly EMA 14, including motor brake 57, additionally includes coupling mechanism 82 to brake armature 60 (128). In some examples, mechanism 82 may include a spring 86 enclosed in a spring housing 88, and a connecting member 84 attached to one end of spring 86, as shown in FIG. 3. In such an example, connecting member 84 may be coupled to brake armature 60 by a rotational connector 90, which allows relative rotation between brake armature 60 and connecting member 84. Spring housing 88 may be connected to another element of EMA 14, such as a housing of EMA 14, to help prevent movement of spring housing 88 and to allow spring 86 to exert a force on brake armature 60 through connecting member 84 and rotational connector 90.

In other examples, as illustrated in FIG. 3, coupling mechanism 82 to brake armature 60 (128) includes fixedly attaching anti-rotation pin 104 to brake armature 60 and attaching hard stop 106 to a non-moving portion of EMA 14, such as a housing of EMA 14. Together, anti-rotation pin 104 and hard stop 106 may help prevent brake armature 60 from rotating in a first rotational direction 94 beyond a position at which anti-rotation pin 104 contacts hard stop 106.

In some examples, coupling mechanism 82 to brake armature 60 (128) includes coupling mechanism 82 to brake armature 60 using a series of gears (e.g., gears 114 and 116 of FIG. 5). In some implementations, first gear 114 and second gear 116 may reduce movement of connecting member 84 compared to movement of brake armature 60. Additionally or alternatively, first gear 114 and second gear 116 may allow brake armature 60 to rotate more than one-half of one turn in the second rotational direction 96 while increasing a force applied to spring 86. In this way, first gear 114 and second gear 116 may facilitate greater rotation of brake armature 60 compared to the mechanisms without gears shown in FIGS. 3 and 4 while allowing spring 86 to exert a restoring force on brake armature 60. The number of gears 114, 116 and the relative size of gears 114, 116 may be selected based on various considerations, including for example, the desired amount of rotation of brake armature 60, the desired movement of connecting member 84, the physical configuration (e.g., space constraints within EMA 14) of brake armature 60 and mechanism 82, or the like.

Various examples have been described. These and other examples are within the scope of the following claims.

The invention claimed is:

1. A system comprising:
  a brake rotor;
  a brake armature, wherein the brake armature and the brake rotor are configured to engage each other to substantially fix a rotational position of the brake rotor relative to the brake armature, and wherein the brake armature is configured to rotate in a first rotational direction and a second rotational direction substantially opposite the first rotational direction; and
  a mechanism mechanically coupled to the brake armature that is configured to maintain the brake armature in a fixed rotational position when a torque applied to the brake armature in the second rotational direction is less than or equal to a threshold torque value, wherein the mechanism is configured to permit rotation of the brake armature in the second rotational direction when torque on the brake armature in the second rotational direction exceeds the threshold torque value.

2. The system of claim 1, wherein the mechanism substantially prevents the brake armature from rotating beyond the fixed position in the first rotational direction.

3. The system of claim 2, wherein the mechanism comprises a hard stop and an anti-rotation pin attached to the brake armature, and wherein anti-rotation pin is configured to contact the hard stop to prevent the brake armature from rotating beyond the fixed position in the first rotational direction.

4. The system of claim 2, wherein the mechanism comprises a spring housing and a connecting member including a shoulder disposed within the spring housing, and wherein the shoulder is configured to contact the spring housing to restrict rotation of the brake armature beyond the fixed position in the first rotational direction.

5. The system of claim 1, wherein the mechanism comprises a device that reversibly stores mechanical energy generated by the torque applied to the brake armature when the torque applied to the brake armature increases above the threshold torque value and the brake armature rotates in the second direction, and wherein the device restores the mechanical energy by causing the brake armature to rotate in the first direction when the torque applied to the brake armature is above the threshold torque value and subsequently decreases.

6. The system of claim 5, wherein the device comprises at least one of a coil spring, a leaf spring, a torsion spring, or a torsion bar.

7. The electronic brake actuator of claim 1, further comprising gears that mechanically couple the mechanism and the brake armature.

8. An electromechanical actuator (EMA) comprising:
  a motor;
  a motor shaft coupled to the motor;
  a brake rotor attached to the motor shaft in a substantially fixed rotational position relative to the motor shaft;
  a brake armature, wherein the brake armature and the brake rotor are configured to engage each other to substantially fix a rotational position of the brake rotor relative to the brake armature, wherein the brake armature defines an outer circumference;
  an armature support bearing engaged with the outer circumference of the brake armature; and
  a mechanism coupled to the brake armature, wherein the mechanism substantially prevents the brake armature, when engaged with the brake rotor, from rotating beyond a fixed position in a first rotational direction, wherein the mechanism restricts rotation of the brake armature, when engaged with the brake rotor, in a second rotational direction when torque on the motor shaft in the second rotational direction is less than or equal to a threshold torque value, and wherein the mechanism allows the brake armature, when engaged with the brake rotor, to rotate in the second rotational direction when torque on the motor shaft in the second rotational direction exceeds the threshold torque value, and wherein the second rotational direction is substantially opposite the first rotational direction.

9. The EMA of claim 8, further comprising a ram that moves linearly to increase pressure and decrease pressure applied to a brake stack, and wherein the ram comprises at least one of a ball screw, an acme screw, or a roller screw, which translates rotational motion of the motor shaft to linear motion of the ram.

10. The EMA claim 9, wherein the motor shaft rotates in the first rotational direction to linearly extend the ram and increase pressure applied to the brake stack, and wherein the motor shaft rotates in the second rotational direction to linearly retract the ram and decrease pressure applied to the brake stack.

11. The EMA of claim 8, wherein the mechanism comprises a hard stop and an anti-rotation pin attached to the brake armature, and wherein anti-rotation pin is configured to contact the hard stop to prevent the brake armature from rotating beyond the fixed position in the first rotational direction.

12. The EMA of claim 8, wherein the mechanism comprises a spring housing and a connecting member including a shoulder disposed within the spring housing, and wherein the shoulder is configured to contact the spring housing to restrict rotation of the brake armature beyond the fixed position in the first rotational direction.

13. The EMA of claim 8, wherein the mechanism comprises a device that reversibly stores mechanical energy generated by the torque exerted on the motor shaft when the torque exerted on the motor shaft increases above the threshold torque value and the brake armature rotates in the second direction, and wherein the device restores the mechanical energy by causing the brake armature to rotate in the first direction when the torque exerted on the motor shaft is above the threshold torque value and subsequently decreases.

14. The EMA of claim 13, wherein the device comprises at least one of a coil spring, a leaf spring, a torsion spring, or a torsion bar.

15. The EMA of claim 8, further comprising gears that mechanically couple the mechanism and the brake armature.

16. A method comprising:
attaching a brake rotor to a motor shaft of an electromagnetic actuator (EMA), wherein the brake rotor is in a substantially fixed rotational position relative to the motor shaft;
disposing a brake armature about the brake rotor such that the brake armature and the brake rotor can engage and disengage with each other, and wherein, when the brake armature and the brake rotor are engaged, the brake armature is held in a substantially fixed rotational position relative to the brake rotor; and
mechanically coupling a mechanism to the brake armature, wherein the mechanism substantially prevents the brake armature, when engaged with the brake rotor, from rotating beyond a fixed position in a first rotational direction, wherein the mechanism restricts rotation of the brake armature, when engaged with the brake rotor, in a second rotational direction when torque on the motor shaft in the second rotational direction is less or equal to than a threshold torque value, and wherein the mechanism allows the brake armature, when engaged with the brake rotor, to rotate in the second rotational direction when torque on the motor shaft in the second rotational direction exceeds the threshold torque value, and wherein the second rotational direction is substantially opposite the first rotational direction.

17. The method of claim 16, wherein coupling the mechanism to the brake armature comprises coupling the mechanism to the brake armature via a series of gears.

18. The method of claim 16, wherein coupling the mechanism to the brake armature comprises coupling a device that reversibly stores mechanical energy due to the torque exerted on the motor shaft when the torque exerted on the motor shaft increases above the threshold value and the brake armature rotates in the second direction, and wherein the device restores the mechanical energy by causing the brake armature to rotate in the first direction when the torque exerted on the motor shaft is above the threshold torque value and subsequently decreases.

19. The method of claim 18, wherein coupling the device to the brake armature comprises coupling at least one of a compression spring, extension spring, torsion spring, leaf spring, torsion bar, or a ball ramp mechanism to the brake armature.

20. The method of claim 19, wherein coupling the mechanism to the brake armature comprises fixedly attaching an anti-rotation pin to the brake armature and coupling a hard stop to a housing of the EMA, wherein the anti-rotation pin is configured to contact the hard stop to prevent the brake armature from rotating beyond the fixed position in the first rotational direction.

* * * * *